Oct. 28, 1952

N. P. PEET 2,615,796

VESSEL FOR FLUID CATALYST REACTION WITH MEANS FOR
VARYING HEIGHT OF THE DENSE PHASE

Filed Feb. 17, 1951

INVENTOR.
Nick P. Peet,
BY
J.S. McKean
ATTORNEY.

Patented Oct. 28, 1952

2,615,796

UNITED STATES PATENT OFFICE 2,615,796

VESSEL FOR FLUID CATALYST REACTION WITH MEANS FOR VARYING HEIGHT OF THE DENSE PHASE

Nick P. Peet, Baytown, Tex., assignor, by mesne assignments, to Standard Oil Development Company, Elizabeth, N. J., a corporation of Delaware Application February 17, 1951, Serial No. 211,538

3 Claims. (Cl. 23—288)

This application is directed to a reactor for conducting a chemical reaction in which a body of fluidized solid catalyst is maintained in the reaction zone.

It is known to the art to use a solid catalyst in a fluidized state for conducting chemical reactions, particularly for cracking petroleum fractions. One type of reactor being used commercially for conducting this reaction is commonly termed the down-flow type inasmuch as spent catalyst is removed from the dense phase by downward flow. This reactor may be described generally as consisting of a shell with an inner cylindrical member arranged concentrically in the lower part of the shell and having side ports so that the spent catalyst is withdrawn through said side ports into the annular space between the inner cylindrical member and the shell.

The annular space between the shell and the inner cylindrical member is the stripping space and since it may be made relatively thin and high, it insures good stripping of the spent catalyst. It is preferred to divide this annular space into a considerable number of stripping cells by the use of vertical partitions between the shell and inner cylindrical member in order to secure more uniform distribution of the spent catalyst within the stripper space. In order to secure good catalyst distribution within this space it is necessary to provide an adequate number of side ports in the wall of the inner cylindrical member. If the space is provided with the partitions which divide it into a number of cells, it is necessary that each cell have at least one port discharging into it. Steam is introduced into the lower portion of the annular space and flows upwardly to strip off carbonaceous materials from the spent catalyst. The stripping steam and stripped hydrocarbons pass into the upper portion of the reactor shell after they leave the annular space between the inner cylindrical member and the shell. The stripping of the spent catalyst is particularly important in that the complete commercial equipment must include a catalyst regenerator for regenerating the spent catalyst and often the throughput of the system is limited by the capacity of the regenerator; thorough steam stripping within the stripper is of particular importance in that it reduces the amount of capacity required by the regenerator.

For a description of a reactor of the downflow type for conducting fluid catalyst reactions, see Ogorzaly U. S. Patent 2,481,439, and U. S. Patent application Ser. No. 77,818, filed February 23, 1949, in the name of Peet.

The present invention is directed to a reactor of the down-flow type for conducting chemical reactions in the presence of fluidized solid catalysts; the reactor has an annular stripping zone which is provided with a means whereby an operator may vary the height of the dense catalyst phase. The apparatus may be described briefly as consisting of wall members bounding the inner, outer and upper sides of the stripping zone which is an annular space (with the inner wall member also being the wall confining the dense catalyst phase), an extension member having its lower edge secured to one of the wall members and extending upwardly to define the upper limits of the disperse phase, and a conduit structure provided with valve means to vary its effective flow area connecting the annular stripping zone with the reactor at a point above the dense phase portion of the fluidized catalyst.

Specific embodiments of the present invention will now be described in conjunction with the drawing in which Fig. 1 is in the form of an elevation partly in section showing one embodiment of the present invention;

Fig. 3 is in the form of an elevation partly in section showing another embodiment of the present invention.

Figure 1:
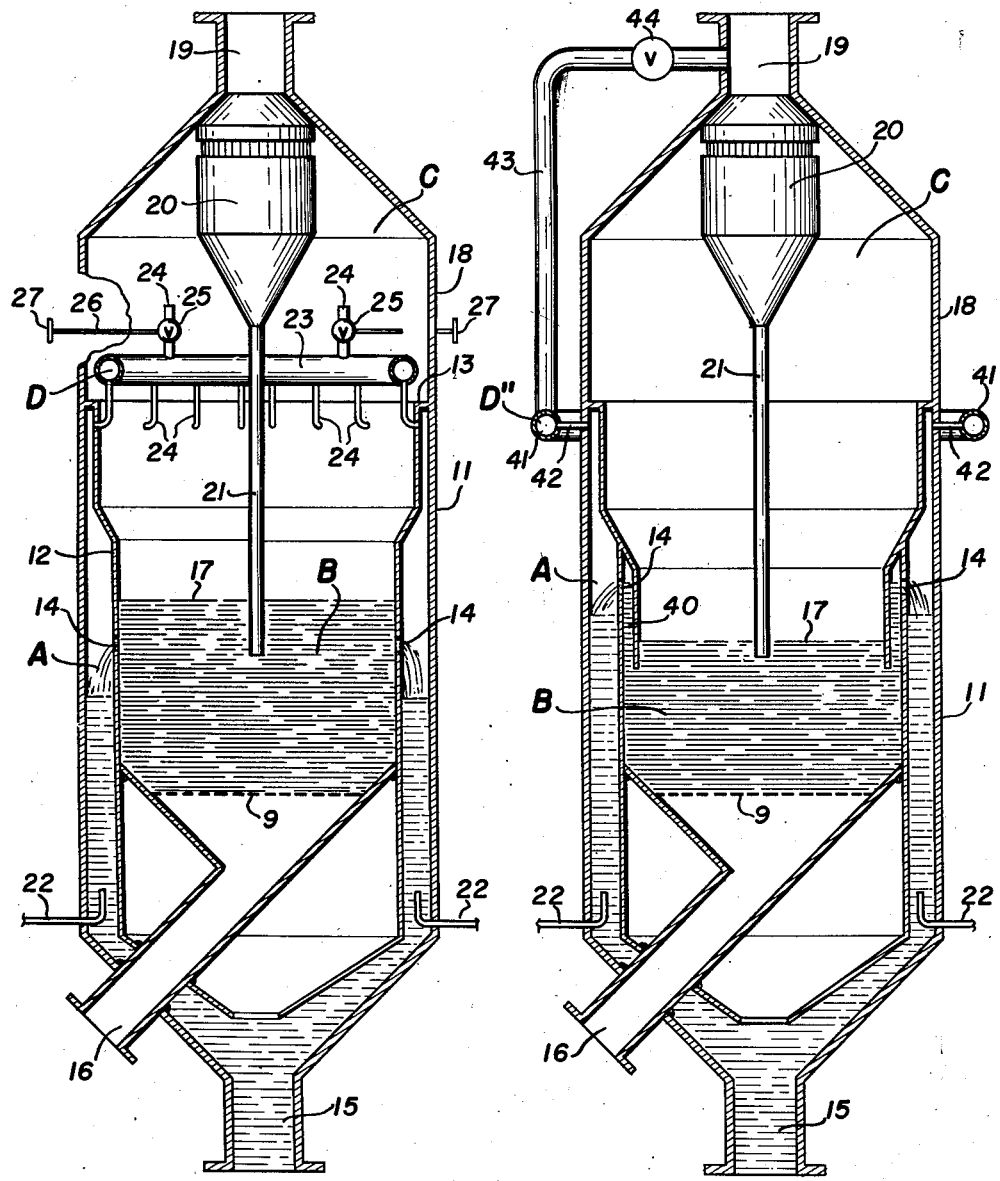

Turning now specifically to the drawing and first to Fig. 1, the principal parts of the space in the reactor are designated by letters. These spaces are the stripper A in the form of an annulus, the dense phase B of the catalyst and the disperse phase C of the catalyst, and conduit means D.

The stripping section which is the annular space A has its outer, inner and upper portions bounded by outer wall member 11, inner wall member 12 and annular wall member 13, respectively. Annular member 13 has its outer edge secured to the upper end of outer wall member 11 and its inner edge secured to the upper end of inner wall member 12 and thus seals off the upper end of the stripping zone. Inner wall member 12 is pierced by ports 14 for the purpose of allowing catalyst from the dense phase to be drawn off into stripping space A for stripping before it is sent to a regeneration zone. The spent catalyst is drawn off from stripping space A through conduit 15 for the purpose of sending it to a regenerator which, in order to simplify the drawing, has not been shown. It will be seen that the lower end of outer wall member 11 is attached to conduit 15 through a lower tapered section.

Fresh or regenerated catalyst in admixture with reactants in a gasiform condition is introduced from the regeneration zone (not shown in the drawing) through conduit 16 and discharges into the lower tapered section of wall portion 12 and hence occupies the space B with its upper surface designated as 17.

A cylindrical extension member 18 has its lower edge secured to one of the wall members which helps to define the stripping space A and has its upper edge terminating in a conduit 19 for the purpose of removing gases from the interior of the reactor. Thus the inner wall of extension member 18 and a portion of the upper inner wall of member 12 and the upper surface of member 13 form the portion of the vessel which confines the disperse phase C. In the course of the reaction it will be understood that the reactants are introduced in gasiform condition through conduit 16, pass upwardly through dense phase B where they react in contact with the catalyst and then pass from dense phase B to disperse phase C. It is desirable to separate substantially all of the catalyst from the reacted gases in disperse phase C before they are withdrawn through conduit 19 and to accomplish this a cyclone separator 20 is arranged in the upper portion of the reactor. Of the materials which pass into the cyclone separator, reacted materials in gasiform condition pass out of the top into conduit 19 and separated solids are discharged downwardly through pipe 21 into the dense phase B. The reactor grid plate 9 is secured to inner wall 12; as well known to the art, the mixture of catalyst and reactant gases passes upwardly through grid 9 so that it forms the lower boundary of dense phase B.

As heretofore explained, the catalyst in dense phase B becomes contaminated and must be regenerated. Catalyst is withdrawn from dense phase B through side ports 14 into stripping zone A where the catalyst passes downwardly and is met by upwardly flowing steam introduced into zone A through steam pipes 22. The upper boundary 17 of the dense phase must be maintained above ports 14 in order to allow withdrawal of the catalyst through ports 14. In order to allow the level 17 to be varied (this changes the depth of the catalyst bed and hence the selectivity of the cracking reaction as well as the amount of catalyst in the reactor) a means is provided which enables the pressure within stripper A to be changed at the option of the operator. In the embodiment of Fig. 1, this means is a conduit structure D consisting of a ring 23 with a series of inlet lines 24 each having an end secured to and opening through inner wall 12 and the other end secured to and opening into gathering ring 23. Ring 23 is provided with outlets 24 which discharge into the disperse phase C with the flow area of each discharge outlet controlled by valve 25. Each valve 25 may be provided with an operating rod 26 connected to a hand wheel 27 so that the area of flow of valves 24 may be controlled by an operator outside the reaction vessel.

The position of the upper surface 17 of dense phase B is fixed by the height of the head which provides the amount of pressure required to force catalyst from dense phase B through ports 14 into stripping space A. By decreasing the flow area from the stripper (by closing valves 24) the pressure required to cause the flow of catalyst through ports 14 is increased and this causes the level 17 of catalyst bed B to be raised (this in turn increases the thickness of dense phase B, causes a greater amount of catalyst to be retained in the reactor and results in increased cracking severity). Under some circumstances increased cracking severity, even though it requires a greater amount of catalyst hold up in the reactor, may be a decided economic advantage. If the upper surface 17 of dense phase B is to be lowered, this may be accomplished by increasing the flow area of valves 25, it being understood that in the embodiment of Figs. 1 and 2 the upper boundary 17 of dense phase B must always be maintained above ports 14.

Figure 2:
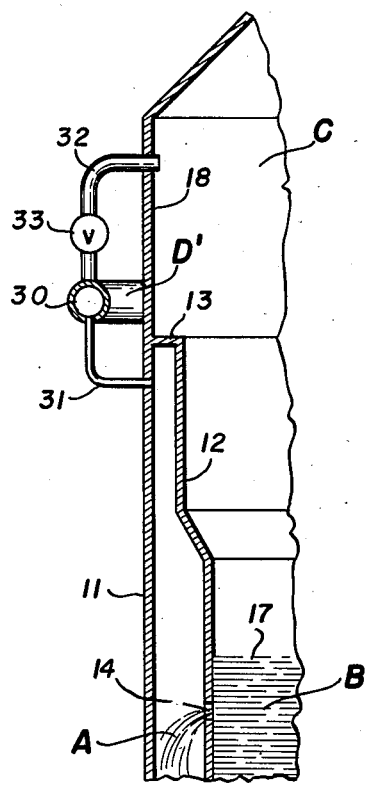
Fig. 2 is a fragmentary view showing an arrangement of parts which may be substituted for corresponding parts of Fig. 1.

Fig. 2 is a fragmentary view showing another embodiment of the conduit means which may be used to connect stripping space A with disperse phase C. In Fig. 2 the conduit means is designated as D' and consists of ring 30 which is arranged outside of extension member 18. Ring 30 is connected to stripping space A by tubes 31 each of which has its lower end attached to and opening through outer wall 14 and its upper end connected to and opening into ring 30. Outlets 32, each having its area of flow controlled by valve 33, are arranged each with its lower end connected into ring 30 and its upper end connected to and discharging through extension wall 18. In the embodiment of Fig. 2, the valves 33 are directly accessible to an operator outside the shell and hence do not require any extension handles passing through the shell as in the embodiment of Fig. 1.

Another embodiment of the present invention is shown in Fig. 3. In this figure parts corresponding to those of previously described embodiments are identified with like reference characters. The embodiment of Fig. 3 has siphons 40 for connecting dense phase B with ports 14. In addition, the embodiment of Fig. 3 has the conduit structure discharging into the upper portion of the reactor above cyclone 20. The conduit structure consists of a ring 41 outside extension wall 18 with pipes 42 attached to and piercing wall 11 and discharging into ring 41 for conducting stripping gases from stripper A into the ring. Ring 41 is connected to discharge pipe 43 which has a valve 44 arranged therein to control the effective flow area thereof, pipe 43 being connected into the upper end of the reactor above cyclone 20. The arrangement of the siphons adjacent ports 14 and the discharge of stripping gases into the reactor above cyclone 20 allows advantage to be taken of the pressure drop through cyclone 20 so that the upper surface 17 of dense phase B may be lowered to a point below side ports 14 without preventing the withdrawal of spent catalyst through these ports. Lowering the level of dense phase B allows the cracking severity within the reactor to be decreased and decreases the amount of catalyst held up in the reactor. It is usual for the pressure drop across a cyclone to be in the neighborhood of 2 or 3 pounds per square inch. By operating the stripper A at a pressure of 2 pounds per square inch lower than the pressure in the reactor, it is possible to lower the catalyst level in the reactor about seven feet below ports 14.

Figure 4:
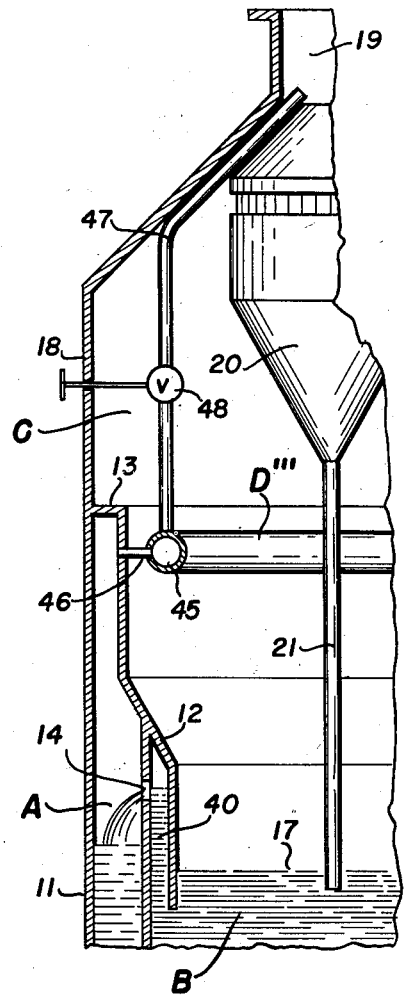
Fig. 4 is a fragmentary view showing a different arrangement of parts which may be substituted for corresponding parts of Fig. 3.

The fragmentary view of Fig. 4 shows parts which may be substituted for like parts of Fig. 3. In Fig. 4 the conduit means D'' is within the reactor. It consists of ring 45 with pipes 46 having their lower ends connected to and piercing inner wall member 12 and the upper ends connected to and discharging into ring 45. A discharge pipe 47 provided with valve 48 for controlling the effective flow area thereof connects ring 45 with the discharge space above cyclone 20. It will be obvious that the arrangement of Fig. 4 may be substituted for like parts of Fig. 3 if desired and like results will be obtained.

By way of example but without intending to limit the invention, it may be mentioned that suitable dimensions for the reactor vessel are a height of 47 feet, diameter of 23 feet, a total height of stripper area A of 28 feet, and a depth of catalyst in the stripping zone of at least 14 feet. With such dimensions it will be found that good operating conditions may be obtained in the embodiment of Figs. 1 and 2 if ports 14 are eight feet above reactor grid 9. In the embodiment of Figs. 3 and 4 the total height of the reactor vessel may be 47 feet and the ports 14 may be eleven feet above the reactor grid 9. The height of the siphon 40 may be seven feet with a pressure drop of two pounds per square inch across the cyclone separator 20. If the disperse phase C is eight feet high, the catalyst reactor hold up will be approximately 100 tons and the hydrocarbon feed rate about 35,000 barrels per day with a cracking temperature in the range of about 925° to about 1000° F.

Having fully described and illustrated preferred embodiments of the present invention, what I wish to claim as new and useful and to secure by Letters Patent is:

1. An apparatus adapted for contacting finely divided solids with gases, said apparatus comprising in combination, wall members bounding and enclosing an annular space consisting of an impermeable vertical, cylindrical, outer wall member, an impermeable inner wall member placed within said outer wall member concentrically therewith, said inner wall member having at least one port opening in its wall to allow the passage of solids from the interior of inner wall member into said annular space, and an impermeable annular wall member with its outer edge secured to said outer wall member and its inner edge secured to said inner wall member, said walls thereby defining an annular stripping section and a central reaction section, a cylindrical extension member having its lower edge secured to one of said wall members and extending upwardly above the wall members, a conduit structure provided with valve means arranged to vary the effective flow area thereof having one end secured to one of said wall members and opening into said annular space near the top thereof and its other end discharging into the interior of said extension member whereby the regulation of the effective flow area is effective to control the differential pressure between the annular space and the interior of the extension member when a fluidized bed is present within the central reaction section, first conduit means connected to the lower end of said inner wall member for introducing solid particles and gaseous reactants into the interior of said inner wall member from a point outside said outer wall member, second conduit means connected to the lower end of the outer wall member for removing solid particles from the lower end of said annular space, and a third conduit connected to the upper end of said extension member for removing gases from the interior thereof.

2. A device in accordance with claim 1 in which the conduit structure consists of an annular ring arranged concentrically within and adjacent the lower edge of said annular wall member with a plurality of inlet pipes each having its lower end connected to and piercing the inner wall member and its upper end connected to and piercing said ring and discharge outlets, each connected to the ring and provided with a valve altering the effective flow area thereof.

3. A device in accordance with claim 1 in which a separating cyclone is arranged within said extension member and secured thereto for separating solids from gases passing into said third conduit and in which the conduit structure consists of a gathering ring arranged adjacent the upper end of the outer wall member, tubes each having one end connected to and piercing said gathering ring and the other end connected to and piercing the outer wall member and a discharge pipe connected with a valve for varying the effective flow area thereof having one end connected to said gathering ring and the other end connected to and piercing the wall of said extension member to discharge into said third conduit above the separating cyclone.

NICK P. PEET.

REFERENCES CITED

The following references are of record in the file of this patent:

UNITED STATES PATENTS

| Number | Name | Date |
| --- | --- | --- |
| 2,530,645 | Bockman | Nov. 21, 1950 |